(12) United States Patent
Izaki

(10) Patent No.: US 8,601,074 B2
(45) Date of Patent: Dec. 3, 2013

(54) ELECTRONIC MAIL COMMUNICATION APPARATUS

(75) Inventor: Takeshi Izaki, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 165 days.

(21) Appl. No.: 13/069,916

(22) Filed: Mar. 23, 2011

(65) Prior Publication Data

US 2012/0066317 A1    Mar. 15, 2012

(30) Foreign Application Priority Data

Sep. 14, 2010    (JP) ................................ 2010-205586

(51) Int. Cl.
*G06F 15/16*    (2006.01)

(52) U.S. Cl.
USPC ......................................................... 709/206

(58) Field of Classification Search
None
See application file for complete search history.

(56) References Cited

U.S. PATENT DOCUMENTS

| | | | |
|---|---|---|---|
| 6,700,674 B1 | 3/2004 | Otsuka et al. | |
| 2002/0184318 A1* | 12/2002 | Pineau | 709/206 |
| 2003/0182383 A1* | 9/2003 | He | 709/206 |
| 2004/0024829 A1 | 2/2004 | Tanimoto | |
| 2004/0059789 A1* | 3/2004 | Shum | 709/206 |
| 2008/0109520 A1 | 5/2008 | Tomita | |
| 2008/0189377 A1* | 8/2008 | Wakabayashi | 709/206 |
| 2008/0263168 A1* | 10/2008 | Ishii | 709/206 |

FOREIGN PATENT DOCUMENTS

| | | |
|---|---|---|
| JP | 11-205574 A | 7/1999 |
| JP | 2004-32113 A | 1/2004 |
| JP | 2008-140355 A | 6/2008 |

* cited by examiner

*Primary Examiner* — Hassan Phillips
*Assistant Examiner* — Omeed D Rahgozar
(74) *Attorney, Agent, or Firm* — Scully, Scott, Murphy & Presser, P.C.

(57) ABSTRACT

An electronic mail receiving apparatus used in a system including an electronic mail transmitting apparatus, the electronic mail receiving apparatus, and an electronic mail server, includes: a communicating unit executes a first-kind electronic mail communication performed via the electronic mail server, and a second-kind electronic mail communication performed not via the electronic mail server; and a mail output controller configured to control an outputting unit configured to output an electronic mail received from the electronic mail transmitting apparatus. The communicating unit includes: a first information transmitting unit configured to, if a first-kind electronic mail is received by executing the first-kind electronic mail communication, transmit, to the electronic mail transmitting apparatus, reception information; and a second information transmitting unit configured to, if a second-kind electronic mail is received by executing the second-kind electronic mail communication, transmit, to the electronic mail transmitting apparatus, reception information by the communication session.

11 Claims, 6 Drawing Sheets

ELECTRONIC MAIL COMMUNICATION APPARATUS

This application is based upon and claims the benefit of priority of Japanese Patent Application No. 2010-205586 filed on Sep. 14, 2010, the contents of which are incorporated herein by reference in its entirety.

BACKGROUND

The present disclosure discloses an art which is used in a system including a plurality of electronic mail communication apparatuses and an electronic mail server.

A related facsimile multifunction apparatus has a function of executing an electronic mail communication via an individual mail server, and a function (the so-called direct SMTP) of executing an electronic mail communication in accordance with the SMTP (Simple Mail Transform Protocol) and not via an individual mail server.

In the case where a facsimile multifunction apparatus is to transmit an electronic mail to a terminal device by using the direct SMTP, the facsimile multifunction apparatus and the terminal device establish a communication session. Usually, the terminal device transmits reception information indicative of reception of the electronic mail, to the facsimile multifunction apparatus by using the communication session which is used for receiving the electronic mail. Therefore, the facsimile multifunction apparatus can know that the terminal device receives the electronic mail.

On the other hand, in the case where the facsimile multifunction apparatus is to transmit an electronic mail to a terminal device via an individual mail server, the facsimile multifunction apparatus transmits the electronic mail to the individual mail server. The terminal device receives the electronic mail which is transmitted from the facsimile multifunction apparatus, and which is stored in the individual mail server, from the individual mail server. Namely, the terminal device receives the electronic mail transmitted from the facsimile multifunction apparatus, without establishing a communication session with the facsimile multifunction apparatus. In the electronic mail communication via the individual mail server, therefore, the facsimile multifunction apparatus cannot receive reception information from the terminal device in the same manner as the electronic mail communication using the direct SMTP.

In the disclosure, an art is provided in which, both in the case where the electronic mail communication is executed via the electronic mail server, and in the case where the electronic mail communication is executed not via the electronic mail server, the electronic mail communication apparatus which is the transmission source of the electronic mail can know that the electronic mail is received by the electronic mail communication apparatus which is the transmission destination of the electronic mail.

According to an aspect of the disclosure, the following arrangements are provided.

An electronic mail receiving apparatus that is to be used in a system including an electronic mail transmitting apparatus, the electronic mail receiving apparatus, and an electronic mail server which is configured separately from the electronic mail transmitting apparatus and the electronic mail receiving apparatus, the electronic mail receiving apparatus comprising:

a communicating unit configured to execute a first-kind electronic mail communication performed via the electronic mail server, and a second-kind electronic mail communication performed not via the electronic mail server, the second-kind electronic mail communication using a communication session established between the electronic mail transmitting apparatus and the electronic mail receiving apparatus; and a mail output controller configured to control an outputting unit to output an electronic mail received from the electronic mail transmitting apparatus by the communicating unit, wherein the communicating unit includes:

a first information transmitting portion configured to, in a first case where a first-kind electronic mail from the electronic mail transmitting apparatus is received by executing the first-kind electronic mail communication, transmit, to the electronic mail transmitting apparatus, first reception information indicating that the first-kind electronic mail is received before the first-kind electronic mail is output by the outputting unit; and a second information transmitting portion configured to, in a second case where a second-kind electronic mail from the electronic mail transmitting apparatus is received by executing the second-kind electronic mail communication by using the communication session, transmit, to the electronic mail transmitting apparatus, second reception information indicating that the second-kind electronic mail is received by using the communication session.

An electronic mail transmitting apparatus that is to be used in a system including the electronic mail transmitting apparatus, an electronic mail receiving apparatus and an electronic mail server which is configured separately from the electronic mail transmitting apparatus and the electronic mail receiving apparatus, the electronic mail transmitting apparatus comprising:

a communicating unit configured to execute a first-kind electronic mail communication performed via the electronic mail server, and a second-kind electronic mail communication performed not via the electronic mail server, the second-kind electronic mail communication using a communication session established between the electronic mail transmitting apparatus and the electronic mail receiving apparatus, wherein the communicating unit includes:

a first information receiving portion configured to, in a first case where a first-kind electronic mail is transmitted to the electronic mail receiving apparatus by executing the first-kind electronic mail communication, receive first reception information indicating that a first-kind electronic mail is received, from the electronic mail receiving apparatus, and a second information receiving portion configured to, in a second case where a second-kind electronic mail is transmitted to the electronic mail receiving apparatus by executing the second-kind electronic mail communication by using the communication session, receive second reception information indicating that the second-kind electronic mail is received, from the electronic mail receiving apparatus by using the communication session, and wherein the first reception information is transmitted from the electronic mail receiving apparatus before the first-kind electronic mail is output by an outputting unit of the electronic mail receiving apparatus.

A network system comprising:

an electronic mail transmitting apparatus;

an electronic mail receiving apparatus; and an electronic mail server which is configured separately from the electronic mail transmitting apparatus and the electronic mail receiving apparatus, wherein the electronic mail transmitting apparatus includes:

a first communicating unit configured to execute a first-kind electronic mail communication performed via the electronic mail server to transmit a first-kind electronic mail, and a second-kind electronic mail communication performed not via the electronic mail server to transmit a second-kind electronic mail, the second-kind electronic mail communication using a communication session established between the electronic mail transmitting apparatus and the electronic mail receiving apparatus, wherein the electronic mail receiving apparatus includes:

a second communicating unit configured to execute a third-kind electronic mail communication to receive the first-kind electronic mail from the first communicating unit, and the second-kind electronic mail communication to receive the second-kind electronic mail; and a mail output controller configured to control an outputting unit to output one of the first-kind and second-kind electronic mail received from the electronic mail transmitting apparatus by the second communicating unit, wherein the second communicating portion includes:

a first information transmitting portion configured to, in a case where the second communicating unit receives the first-kind electronic mail from the first communicating unit, transmit, to the electronic mail transmitting apparatus, first reception information indicating that the first-kind electronic mail is received before the first-kind electronic mail is output by the outputting unit; and a second information transmitting unit configured to, in a case where the second communicating unit receives the second-kind electronic mail from the first communicating unit, transmit, to the electronic mail transmitting apparatus, second reception information indicating that the second-kind electronic mail is received by using the communication session, and wherein the first communicating unit includes:

a first information receiving portion configured to receive the first reception information from the first information transmitting unit, and a second information receiving portion configured to receive the second reception information from the second information transmitting unit by using the communication session.

DESCRIPTION OF EXEMPLARY EMBODIMENTS

Configuration of Network System

Figure 1:
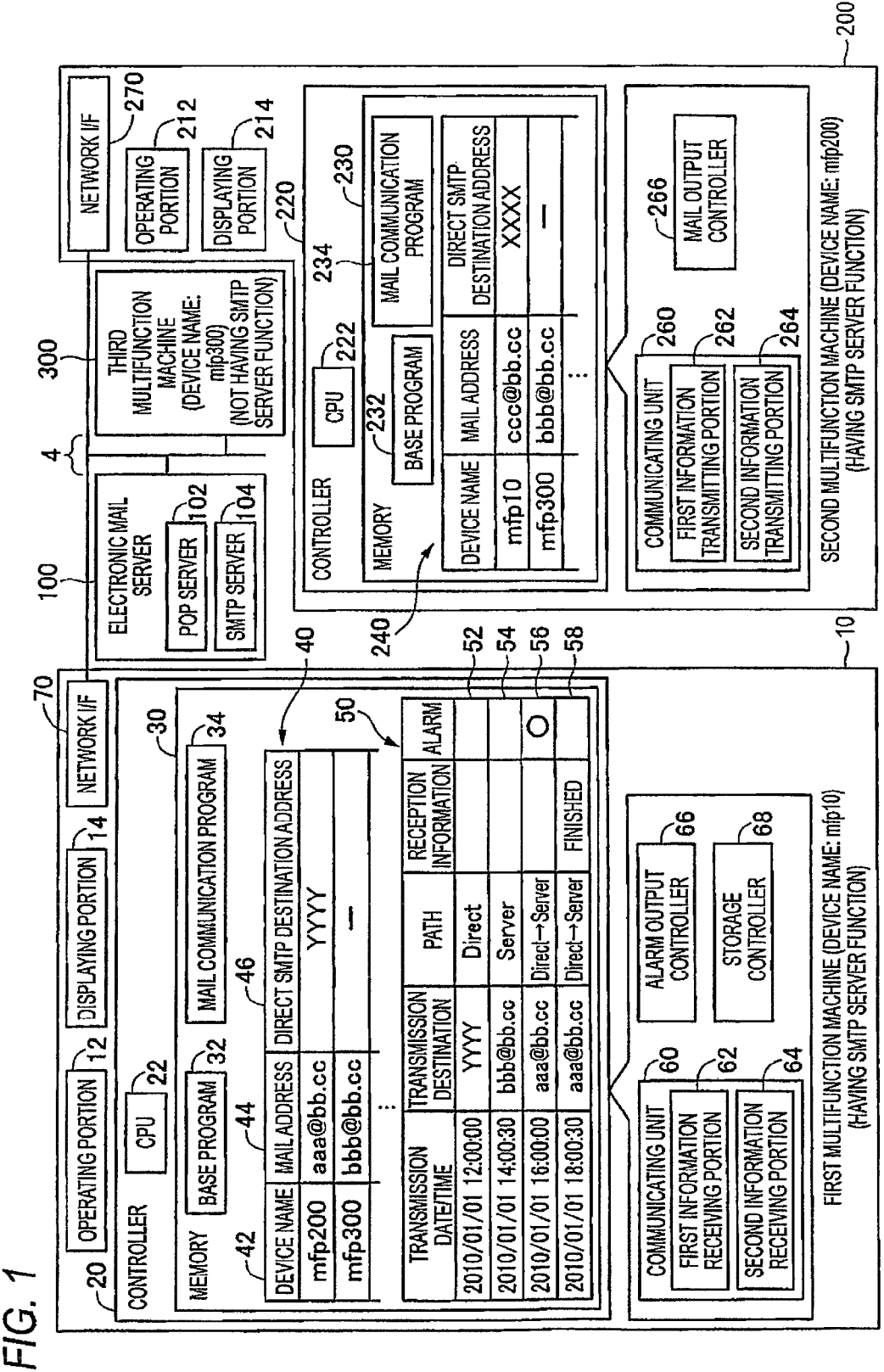
FIG. 1 is a diagram showing the configuration of a network system.

As shown in FIG. 1, a network system 2 includes first to third multifunction machines 10, 200, 300, and an electronic mail server 100. The first and second multifunction machines 10, 200 can communicate with each other via a LAN 4. The multifunction machines 10, 200, 300 can communicate with the electronic mail server 100 via the LAN 4. The multifunction machines 10, 200, 300 are provided with respective specific device names. The device names of the multifunction machines 10, 200, 300 are mfp10, mfp200, and mfp300, respectively.

(Configuration of First Multifunction Machine)

The first multifunction machine 10 includes an operating portion 12, a displaying portion 14, a controller 20, and a network interface 70. The first multifunction machine 10 further includes a print executing portion and scanner portion which are not shown.

The controller 20 includes a CPU 22 and a memory 30. The memory 30 stores programs 32, 34 for enabling the CPU 22 to execute various processes. The base program 32 includes a program for enabling the print executing portion to execute a printing process, and that for enabling the scanner portion to execute a scanning process.

The mail communication program 34 includes an SMTP server program, an SMTP client program, and a POP (Post Office Protocol) client program. The CPU 22 can execute each of an SMTP server function, an SMTP client function, and a POP client function by respectively executing the SMTP server program, the SMTP client program, and the POP (Post Office Protocol) client program. The SMTP server function includes a function of receiving an electronic mail from an external apparatus (for example, the second and third multifunction machines 200, 300) directly or not via the electronic mail server 100. The SMTP client function includes a function of transmitting an electronic mail to an external apparatus not via the electronic mail server 100, and that of transmitting an electronic mail to an external apparatus via the electronic mail server 100. The POP client function includes a function of receiving an electronic mail from an external apparatus via the electronic mail server 100.

The memory 30 further stores an address book 40 and a mail transmission table 50. In the address book 40, the device name 42 of an external apparatus (for example, the second and third multifunction machines 200, 300), and the mail address 44 and direct SMTP destination address 46 of the external apparatus are correspondingly recorded. The mail address 44 is an address which, when an electronic mail is to be transmitted to the external apparatus via the first multifunction machine 10, is designated as the transmission destination. The direct SMTP destination address 46 is an address which, when an electronic mail is to be directly transmitted to the external apparatus (for example, the second multifunction machine 200), is designated as the transmission destination. Usually, the direct SMTP destination address 46 is the IP address of the external apparatus (for example, the second multifunction machine 200). In another embodiment, for example, the direct SMTP destination address may be specific information (for example, the host name of the external apparatus) which specifies the external apparatus. In this case, the first multifunction machine 10 may be communicatibly connected to a specific server (for example, a DNS server) which correspondingly stores the specific information and an IP address. The first multifunction machine 10 may obtain the IP address which is stored correspondingly with the specific information, from the specific server.

In the embodiment, the second multifunction machine 200 can execute the SMTP server function, and the third multifunction machine 300 cannot execute the SMTP server function. In the address book 40, therefore, the direct SMTP destination address 46 of the second multifunction machine 200 is recorded correspondingly with the device name 42

(mfp200) of the second multifunction machine 200. In the address book 40, by contrast, the direct SMTP destination address 46 is not recorded correspondingly with the device name 42 (mfp300) of the third multifunction machine 300. The user can record the device name 42 of the external device and the like into the address book 40, by operating the operating portion 12.

The mail transmission table 50 is a table for recording information related to an electronic mail which is transmitted by the first multifunction machine 10. A plurality of sets of combination information 52 to 58 are recorded in the mail transmission table 50. In the sets of combination information 52 to 58, the transmission date and time of an electronic mail, the transmission destination of the electronic mail, the path along which the electronic mail is transmitted, information indicative of presence or absence of reception information of the electronic mail, and information indicating whether an alarm is to be performed or not are made correspondent to one another.

The CPU 22 executes various processes in accordance with the programs 32, 34. When the CPU 22 executes processes in accordance with the mail communication program 34, functions of a communicating unit 60, an alarm output controller 66, and a storage controller 68 are realized. The communicating unit 60 includes a first information receiving portion 62 and a second information receiving portion 64.

(Configuration of Electronic Mail Server)

In the electronic mail server 100, a mail address which is set in an external apparatus (for example, the multifunction machines 10, 200 and the like) that executes electronic mail communication by using the electronic mail server 100 is registered. The electronic mail server 100 includes a POP server 102 and an SMTP server 104. The SMTP server 104 receives an electronic mail which is transmitted from an external apparatus (for example, the first multifunction machine 10). The SMTP server 104 determines whether the electronic mail server (the portion after "@" of the mail address of the transmission destination) which is designated as the transmission destination of the received electronic mail indicates the electronic mail server 100 or a specific electronic mail server including a specific SMTP server that is different from the SMTP server 104. If the electronic mail server which is designated as the transmission destination of the received electronic mail indicates the electronic mail server 100, the SMTP server 104 correspondingly stores the account information (the portion before "@" of the mail address of the transmission destination) designated as the transmission destination of the received electronic mail, and the received electronic mail, in a mail box of the SMTP server 104. By contrast, if the electronic mail server which is designated as the transmission destination of the received electronic mail indicates the above-described specific electronic mail server, the SMTP server 104 transfers the received electronic mail to the SMTP server included in the specific electronic mail server. The SMTP server 104 further receives an electronic mail which is transferred from another SMTP server, and correspondingly stores the account information designated as the transmission destination of the electronic mail, and the electronic mail, in the mail box of the SMTP server 104.

In response to a request from an external apparatus (for example, the multifunction machines 10, 200 and the like) connected to the LAN 4, the POP server 102 transmits an electronic mail which is stored in the mail box correspondingly with the account information contained in the request, to the external apparatus. As a result, the external apparatus can receive the electronic mail.

(Configuration of Second Multifunction Machine)

Next, the configuration of the second multifunction machine 200 will be described. The second multifunction machine 200 includes an operating portion 212, a displaying portion 214, a controller 220, and a network interface 270. The second multifunction machine 200 further includes a print executing portion and scanner portion which are not shown.

The controller 220 includes a CPU 222 and a memory 230. The memory 230 stores programs 232, 234 for enabling the CPU 222 to execute various processes. The base program 232 includes a program for enabling the print executing portion to execute a printing process, and that for enabling the scanner portion to execute a scanning process.

The mail communication program 234 includes an SMTP server program, an SMTP client program, and a POP client program. Similarly with the first multifunction machine 10, therefore, the CPU 222 can execute an SMTP server function, an SMTP client function, and a POP client function.

The memory 230 further stores an address book 240. The address book 240 is configured in a similar manner as the address book 40.

The CPU 222 executes various processes in accordance with the programs 232, 234. When the CPU 222 executes processes in accordance with the mail communication program 234, functions of a communicating unit 260 and a mail output controller 266 are realized. The communicating unit 260 includes a first information transmitting portion 262 and a second information transmitting portion 264.

(Configuration of Third Multifunction Machine)

The third multifunction machine 300 is configured in the same manner as the second multifunction machine 200 except the following configurations. The mail communication program of the third multifunction machine 300 includes the SMTP client program and the POP client program, but does not include the SMTP server program. Namely, the third multifunction machine 300 cannot execute the SMTP server function. Moreover, the third multifunction machine 300 does not include the portions (for example, the second information transmitting portion 264) which are included in the configuration of the second multifunction machine 200, and which execute processes in accordance with the SMTP server program.

(Electronic Mail Transmission Process Executed by First Multifunction Machine 10)

Next, an electronic mail transmission process which is executed by the first multifunction machine 10 will be described with reference to FIG. 2. The user can produce an electronic mail in the controller 20 by operating the operating portion 12. The user can select the device name (mfp200, mfp300, or the like) of the transmission destination of the electronic mail, from the address book 40 in the memory 30. By operating the operating portion 12, the user can input a character string into the subject and text fields of the electronic mail. The user can attach a data file to the electronic mail by operating the operating portion 12. Hereinafter, text data indicating a character string which is input by the user, and a data file which is attached to an electronic mail are referred to as "specific data".

In S12, the communicating unit 60 determines whether the direct SMTP destination address corresponded to the device name of the transmission destination which is selected by the user exists in the address book 40 or not. In the case where the device name of the transmission destination which is selected by the user is the device name of the second multifunction machine 200 (namely, mfp200), for example, the communicating unit 60 determines YES in S12. In the case where the device name of the transmission destination which is selected by the user is the device name of the third multifunction machine 300 (namely, mfp300), for example, the communicating unit 60 determines NO in S12.

If YES in S12, the communicating unit 60 transmits in S14 to S20 the electronic mail to the external apparatus which is specified by the address of the transmission destination, not via the electronic mail server 100. Hereinafter, am electronic mail communication which is executed not via the electronic mail server 100 is referred to as "second-kind electronic mail communication". The second-kind electronic mail communication is often called "direct SMTP". Hereinafter, the processes of S14 to S20 will be described by exemplifying the case where the device of the transmission destination which is selected by the user is the second multifunction machine 200 (namely, the IP address of the device of the transmission destination is the direct SMTP destination address=YYYY).

In S14, the communicating unit 60 tries to establish a communication session with the second multifunction machine 200, in accordance with the SMTP client program of the mail communication program 34. Specifically, the communicating unit 60 first transmits a connection request while setting the IP address (namely, the direct SMTP destination address=YYYY) of the second multifunction machine 200 as the transmission destination, in accordance with the SMTP. The communicating unit 60 monitors whether connectable information (namely, 250 OK) indicating that connection is enabled is received as a replay to the connection request. When connectable information is received from the second multifunction machine 200, the communicating unit 60 determines that a communication session is established (YES in S14), and the process proceeds to S16. In the case where the second multifunction machine 200 has the SMTP server function, usually, a communication session is established between the first multifunction machine 10 and the second multifunction machine 200. For example, the terms "a communication session is established between the first multifunction machine 10 and the second multifunction machine 200" may be rewritten as "a communication path through which data communication is enabled is established between the first multifunction machine 10 and the second multifunction machine 200", or "the first multifunction machine 10 and the second multifunction machine 200 are connected to each other in a manner that a data communication is enabled".

By contrast, in the case where connectable information cannot be received from the second multifunction machine 200, the communicating unit 60 determines that a communication session is not established (NO in S14). For example, the case where a communication session is not established means that where the power souse of the second multifunction machine 200 is turned OFF. IF NO is S14, the process proceeds to S22.

In S16, the communicating unit 60 transmits the electronic mail to the second multifunction machine 200 by using the communication session which is established in S14. In S16, the communicating unit 60 transmits the electronic mail in accordance with the procedure of the SMTP. In S18, then, the second information receiving portion 64 of the communicating unit 60 monitors whether the transmission of the electronic mail is completed. After the communicating unit 60 transmits the electronic mail, specifically, the second information receiving portion 64 monitors whether second reception information indicating that the electronic mail is received by the second multifunction machine 200 (namely, 250 OK) is received from the second multifunction machine 200 by using the communication session which is established in S14. If the second reception information cannot be received even when a predetermined time period elapses after the electronic mail is transmitted in S16 (NO in S18), the process proceeds to S22. For example, the case where the second reception information cannot be received means that where the power souse of the second multifunction machine 200 is turned OFF before the completion of the transmission of the electronic mail, or that where a communication failure occurs and the communication session is interrupted. On the other hand, if the second reception information is received (YES in S18), the communicating unit 60 terminates in S20 the communication session which is established in S14, and the process proceeds to S26.

In S22, the communicating unit 60 adds, to the electronic mail, request information which requests a reception completion mail containing first reception information indicating that the electronic mail is received by the second multifunction machine 200 (for example, text data indicating that the electronic mail is received). In S24, then, the communicating unit 60 transmits the electronic mail containing the above-described specific data to the SMTP server 104 in accordance with the SMTP client program of the mail communication program 34. The contents of the process in S24 which is executed after the execution of S22 are different from those of the process in S24 which is executed after the determination of NO in S12.

In S24 which is executed after the execution of S22, the communicating unit 60 transmits the electronic mail containing the specific data and the request information, to the SMTP server 104. In this case, the communicating unit 60 replaces the direct SMTP destination address (namely, YYYY) which is designated as the address of the transmission destination of the electronic mail, with a mail address (namely, aaa@bb.cc) which is recorded in the address book 40 correspondingly with the SMTP server address. Hereinafter, an electronic mail communication which is performed via the electronic mail server 100 is referred to as "first-kind electronic mail communication". According to the configuration, in the case where an electronic mail cannot be transmitted by executing the second-kind electronic mail communication, the communicating unit 60 can transmit the electronic mail by executing the first-kind electronic mail communication.

By contrast, in S24 which is executed if NO in S12 (for example, in the case where the device name of the third multifunction machine 300 (namely, mfp300) is selected by the user), the communicating unit 60 transmits the electronic mail containing the specific data to the SMTP server 104. Unless otherwise designated by the user, the communicating unit 60 transmits an electronic mail not containing request information to the SMTP server 104. Since the third multifunction machine 300 does not include the SMTP server function, the third multifunction machine cannot execute the second-kind electronic mail communication. In the case where the device name of the third multifunction machine 300 (namely, mfp300) is selected by the user, therefore, an electronic mail is produced in which the mail address (namely, bbb@bb.cc) of the third multifunction machine 300 is designated as the address of the transmission destination of the electronic mail.

In S26, the storage controller 68 records information (for example, the combination information 58) related to the transmitted electronic mail in the mail transmission table 50, and the electronic mail transmission process is terminated. Specifically, the storage controller 68 records the transmission date and time, transmission destination, and path of the electronic mail in the mail transmission table 50. As the transmission date and time, information indicative of the date and time when the transmission of the electronic mail is completed is recorded. As the transmission destination, information indicative of the address (the mail address or the direct SMTP transmission destination address) of the transmission destination of the electronic mail is recorded. As the path, information indicative of one of "Direct", "Server", "Direct→Server" is recorded. If the electronic mail is transmitted by the second-kind electronic mail communication (the direct SMTP) (if YES in S18), information indicative of "Direct" is recorded. If the electronic mail is transmitted by the first-kind electronic mail communication (If NO in S12, and S24 is executed), information indicative of "Server" is recorded. If the electronic mail cannot transmitted by the second-kind electronic mail communication, and is transmitted by the first-kind electronic mail communication (if NO in S14 or S18, and S24 is executed), information indicative of "Direct→Server" is recorded.

(Reception Completion Mail Reception Process Executed by First Multifunction Machine 10)

Next, a reception completion mail reception process which is executed by the first multifunction machine 10 will be described. When the power source of the first multifunction machine 10 is turned ON, the reception completion mail reception process is started. As shown in FIG. 3, in S32, the first information receiving portion 62 monitors whether a reception completion mail is received. The first information receiving portion 62 can receive the reception completion mail by two methods. In one of the methods, the first information receiving portion 62 executes the second-kind electronic mail communication to receive the reception completion mail. Namely, the first information receiving portion 62 executes processes in accordance with the SMTP server program to receive the reception completion mail from an external apparatus (for example, the second multifunction machine 200) which executes processes in accordance with the SMTP client program. In the other method, the first information receiving portion 62 executes the first-kind electronic mail communication to receive the reception completion mail. Namely, the first information receiving portion 62 executes processes in accordance with the POP client program to receive the reception completion mail from the POP server 102 of the electronic mail server 100. The reception completion mail contains the first reception information indicating that the electronic mail transmitted in S24 of FIG. 2 is received by an external apparatus (for example, the second multifunction machine 200), and date and time information indicative of the transmission date and time of the electronic mail.

If the reception completion mail is received (YES in S32), the storage controller 68 updates in S34 the mail transmission table 50. In S34, namely, the storage controller 68 records information indicative of reception of the reception completion mail (information indicating "Finished" in the column of the reception information of the mail transmission table 50) in combination information (for example, the combination information 58) containing the transmission date and time which coincides with the date and time information contained in the reception completion mail. In the case where a plurality of sets of combination information which coincides with the date and time information contained in the reception completion mail exist in the mail transmission table 50, the storage controller 68 records information indicative of reception of the reception completion mail, in combination information containing the transmission destination which coincides with the mail address of the transmission source of the reception completion mail, among the plurality of sets of combination information. By contrast, if the reception completion mail is not received (NO in S32), the process proceeds to S36.

In S36, the alarm output controller 66 determines whether a predetermined time period (for example, five minutes) elapses after previous execution in S36 or not. In the first process of S36, the alarm output controller 66 determines whether the predetermined time period elapses after the reception completion mail reception process is started. If NO in S36, the process returns to S32. If YES in S36, the alarm output controller 66 determines in S38 whether combination information containing "Direct→Server" is recorded in the mail transmission table 50 or not. If NO in S38, the process returns to S32. If YES in S38, by contrast, the alarm output controller 66 determines in S40 whether information indicating "Finished" is recorded in the reception information of combination information containing "Direct→Server" (for example, combination information 56 or 58) in the mail transmission table 50 or not. Namely, the alarm output controller 66 determines whether, with respect to an electronic mail (an electronic mail which is determined NO in S18, and which is transmitted in S24) which is transmitted by executing the first-kind electronic mail communication in place of the second-kind electronic mail communication, the reception completion mail is received or not. In the case where a plurality of sets of combination information containing "Direct→Server" are recorded in the mail transmission table 50, the alarm output controller 66 performs the determination of S40 on each one of the plurality of sets of combination information.

If information indicating "Finished" is recorded in all sets of combination information containing "Direct→Server" (YES in S40), the process returns to S32. By contrast, if there is combination information (for example, the combination information 56) in which information indicating "Finished" is not recorded (NO in S40), the combination information is specified. In S42, with respect to each of one or more sets of specified combination information, the alarm output controller 66 determines whether a predetermined time limit (for example, twelve hours) elapses from the transmission date and time contained in the combination information or not. If NO in S42, the process returns to S32. If YES in S42, by contrast, the alarm output controller 66 controls in S44 the displaying portion 14 so as to display alarm information containing: information (namely, the transmission date and time, and the transmission destination) contained in combination information (for example, the combination information 56) in which the time limit (for example, twelve hours) elapses; and information indicating that the first reception information is not received (namely, information indicating that the reception completion mail is not received). According to the configuration, when the user of the first multifunction machine 10 views the displaying portion 14, the user can easily know that the external apparatus which is the transmission destination of the electronic mail does not receive the electronic mail. In S44, the storage controller 68 records information indicating that alarm information is output ("0" in the alarm column in the mail transmission table 50), in the combination information which is displayed as alarm information.

The alarm output controller 66 may control the print executing portion so as to print alarm information, or output alarm information as sound. Alternatively, the alarm output controller 66 may transmit an electronic mail containing alarm information while designating a predetermined address as the transmission destination. Alternatively, in response to a predetermined operation on the operating portion 12 by the user, the alarm output controller 66 may control an outputting unit (for example, the displaying portion 14 or the print executing portion) so as to output all of information contained in the mail transmission table 50 (for example, to display information on the displaying portion 14, or to print information by the print executing portion).

(Electronic Mail Transmission Process Executed by Second Multifunction Machine 200)

Next, an electronic mail transmission process which is executed by the second multifunction machine 200 will be described. The communicating unit 260 of the controller 220 can receive an electronic mail by two methods. In one of the methods, the communicating unit 260 executes processes in accordance with the POP client program to receive an electronic mail from the POP server 102. Namely, the communicating unit 260 executes the first-kind electronic mail communication to receive an electronic mail from the electronic mail server 100. In the other method, the communicating unit 260 executes processes in accordance with the SMTP server program to receive an electronic mail from an external apparatus (for example, the first multifunction machine 10) not via the electronic mail server 100. Namely, the communicating unit 260 executes the second-kind electronic mail communication (the direct SMTP) to receive an electronic mail not via the electronic mail server 100. Hereinafter, the two methods will be described.

(Electronic Mail Transmission Process According to Pop Client Program)

Figure 4:
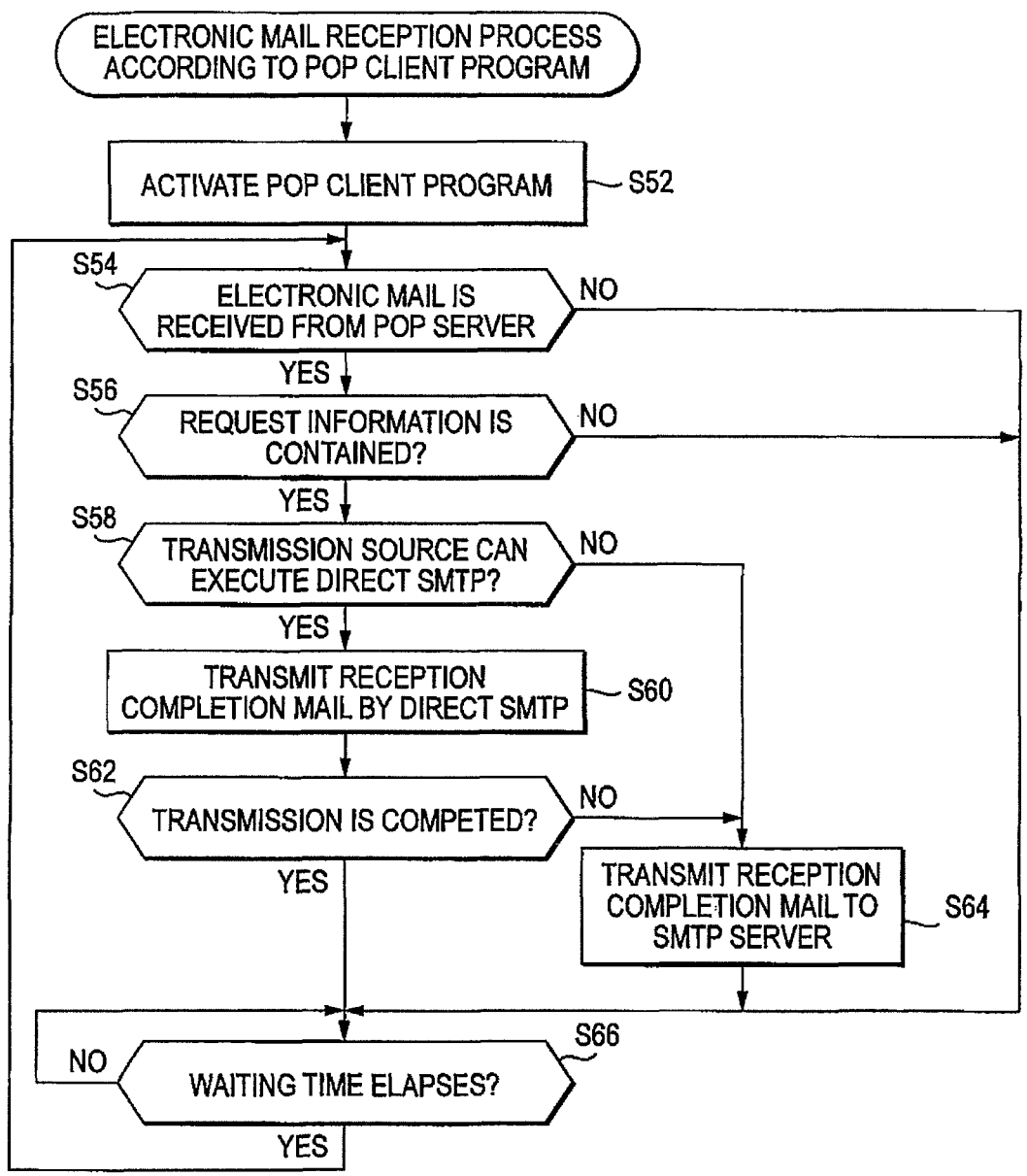
FIG. 4 is a flowchart of an electronic mail reception process according to a POP client program which is executed by a second multifunction machine.

Referring to FIG. 4, first, the process in which the communicating unit 260 receives an electronic mail in accordance with the POP client program will be described. When the power source of the second multifunction machine 200 is turned ON, the communicating unit 260 activates in S52 the POP client program of the mail communication program 234. In S54, then, the communicating unit 260 inquires of the POP server 102 whether an electronic mail in which the second multifunction machine 200 is designated as the transmission destination is stored in the POP server 102 or not. As a result of the inquiry, if an electronic mail is not received from the POP server 102 (NO in S54), the process proceeds to S66. By contrast, as a result of the inquiry, if an electronic mail is received from the POP server 102 (YES in S54), the communicating unit 260 determines in S56 whether the received electronic mail contains the request information or not.

If YES in S54, the communicating unit 260 may cause the displaying portion 214 to display information indicating that an electronic mail is received. In the configuration, the electronic mail itself is not displayed on the displaying portion 214. Therefore, the configuration does not correspond to "controls an outputting unit to output electronic mail".

If the received electronic mail does not contain the request information (NO in S56), the process proceeds to S66. By contrast, if the received electronic mail contains the request information (YES in S56), the first information transmitting portion 262 of the communicating unit 260 determines whether the external apparatus (for example, the first multifunction machine 10) of the transmission destination of the electronic mail which is received in S54 can execute the second-kind electronic mail communication (the direct SMTP) or not (S58). In the case where the direct SMTP destination address is recorded in the address book 240 correspondingly with the mail address of the transmission source of the electronic mail which is received in S54, specifically, the first information transmitting portion 262 determines that the external apparatus of the transmission source of the electronic mail can execute the second-kind electronic mail communication (it is determined YES in S58). In this case, the process proceeds to S60. In the case where the direct SMTP destination address is not recorded in the address book correspondingly with the mail address of the transmission source of the electronic mail which is received in S54, by contrast, the first information transmitting portion 262 determines that the external apparatus of the transmission source of the electronic mail cannot execute the second-kind electronic mail communication (it is determined NO in S58). In this case, the process proceeds to S64. According to the configuration, the second multifunction machine 200 can easily determine whether the external apparatus can execute the second-kind electronic mail communication, by using the address book 240 stored in the memory 230.

In S60, the first information transmitting portion 262 executes the second-kind electronic mail communication in accordance with the SMTP client program to try to transmit the reception completion mail containing first reception information to the external apparatus of the transmission source of the electronic mail. Namely, the first information transmitting portion 262 tries the process of establishing a communication session with the external apparatus of the transmission source of the electronic mail, and that of transmitting the reception completion mail. In S62, then, the first information transmitting portion 262 determines whether the transmission of the reception completion mail is completed or not. For example, the case where the transmission of the reception completion mail is not completed means a case where a communication session has not been established, that where a communication session has been established, but the communication session is ended in the middle of the transmission of the reception completion mail, or that where, as a reply to the reception completion mail, reception information (namely, 250 OK) cannot be received from the external apparatus which is the transmission destination of the reception completion mail.

If the transmission of the reception completion mail is completed (YES in S62), the process proceeds to S66, and, if the transmission of the reception completion mail is not completed (NO in S62), the process proceeds to S64. In S64, the first information transmitting portion 262 designates the mail address of the external apparatus of the transmission source of the electronic mail, as the transmission destination in accordance with the SMTP client program, and transmits the reception completion mail containing first reception information to the SMTP server 104. When S64 is ended, the process proceeds to S66.

In S66, the communicating unit 260 waits until when a predetermined time period (for example, four hours) elapses after the process of the previous S54 is executed. If the predetermined time period elapses (YES in S66), the process returns to S54. In the case of initial S66 after the start of the electronic mail reception process shown in FIG. 4, the communicating unit 260 determines in S66 whether the predetermined time period elapses after the activation of the POP client program (S52) or not.

(Electronic Mail Transmission Process According to SMTP Server Program)

Figure 5:
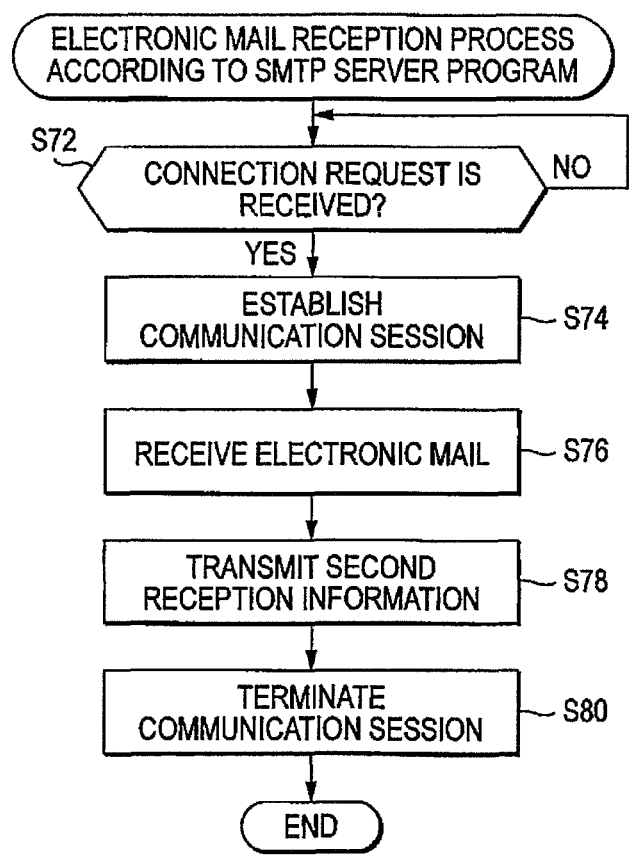
FIG. 5 is a flowchart of an electronic mail reception process according to an SMTP server program which is executed by the second multifunction machine.

Referring to FIG. 5, next, the process in which the communicating unit 260 receives an electronic mail in accordance with the SMTP server program will be described. In S72, the communicating unit 260 monitors in S72 whether a connection request is received from an external apparatus (for example, the first multifunction machine 10). If the connection request is received (YES in S72), the communicating unit 260 executes the process of establishing a communication session with the external apparatus in accordance with the SMTP server program. Specifically, the communicating unit 260 transmits connectable information (namely, 250 OK) indicating that connection is enabled, to the external apparatus as a replay to the connection request. As a result, the communication session is established.

In S76, next, the communicating unit 260 receives an electronic mail from the external apparatus with which the communication session is established. In S78, then, the second information transmitting portion 264 of the communicating unit 260 transmits the second reception information to the external apparatus by using the established communication session. In S80, the communicating unit 260 terminates the communication session to end the process.

After the reception completion mail or the second reception information is transmitted, the mail output controller 266 of the second multifunction machine 200 monitors whether an outputting operation is executed by the user. The user of the second multifunction machine 200 can execute the outputting operation of outputting data contained in the electronic mail which is received in S54 of FIG. 4 or S76 of FIG. 5, by operating the operating portion 212. The outputting operation includes an operation of causing the data contained in the electronic mail to be displayed on the displaying portion 14, or that of causing the data contained in the electronic mail to be printed by the print executing portion. When the outputting operation is executed, the mail output controller 266 controls the outputting unit (namely, the displaying portion 14 or the print executing portion) so as to output an image indicated by the data contained in the electronic mail.

Figure 6:
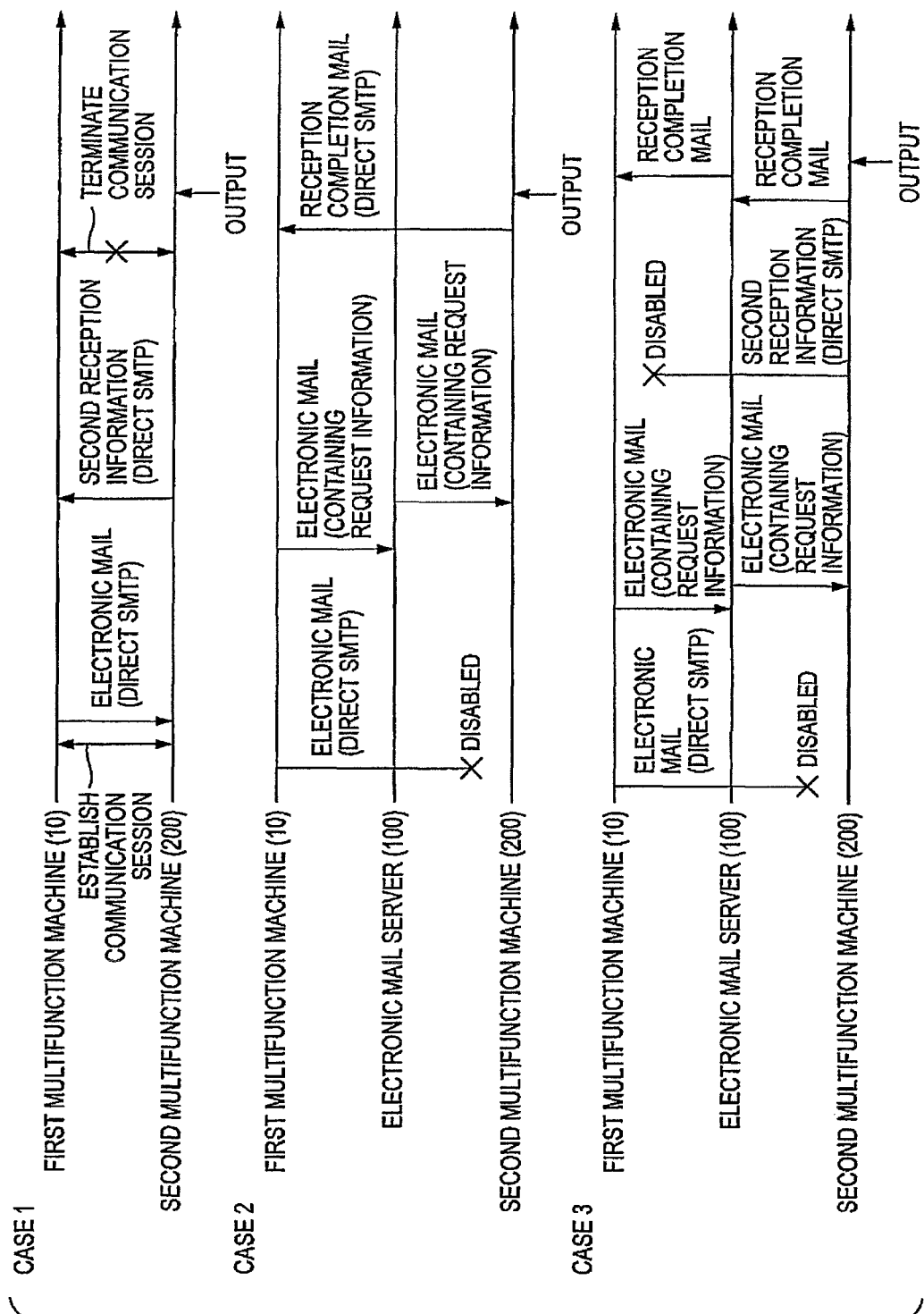
FIG. 6 is a view illustrating various cases of an electronic mail communication.

Case 1 to 3 of electronic mail communication shown in FIG. 6 will be described by exemplifying the case where the first multifunction machine 10 transmits an electronic mail to the second multifunction machine 200. In Case 1, the first multifunction machine 10 executes the second-kind electronic mail communication (the direct SMTP) to transmit an electronic mail to the second multifunction machine 200 (S16 of FIG. 2). Namely, the first multifunction machine 10 establishes a communication session with the second multifunction machine 200 (YES in S14 of FIG. 2). The first multifunction machine 10 transmits the electronic mail to the second multifunction machine 200 by using the established communication session. In this case, the second multifunction machine 200 transmits the second reception information to the first multifunction machine 10 by using the communication session which is already established (S78 of FIG. 5). Namely, when the second multifunction machine 200 receives the electronic mail in accordance with the SMTP, the second multifunction machine transmits the second reception information (namely, 250 OK) to the first multifunction machine 10 before the electronic mail is output. In Case 1, the reception of the electronic mail, and the transmission of the second reception information are executed by using the same communication session. Therefore, the first multifunction machine 10 can early obtain the second reception information.

Figure 2:
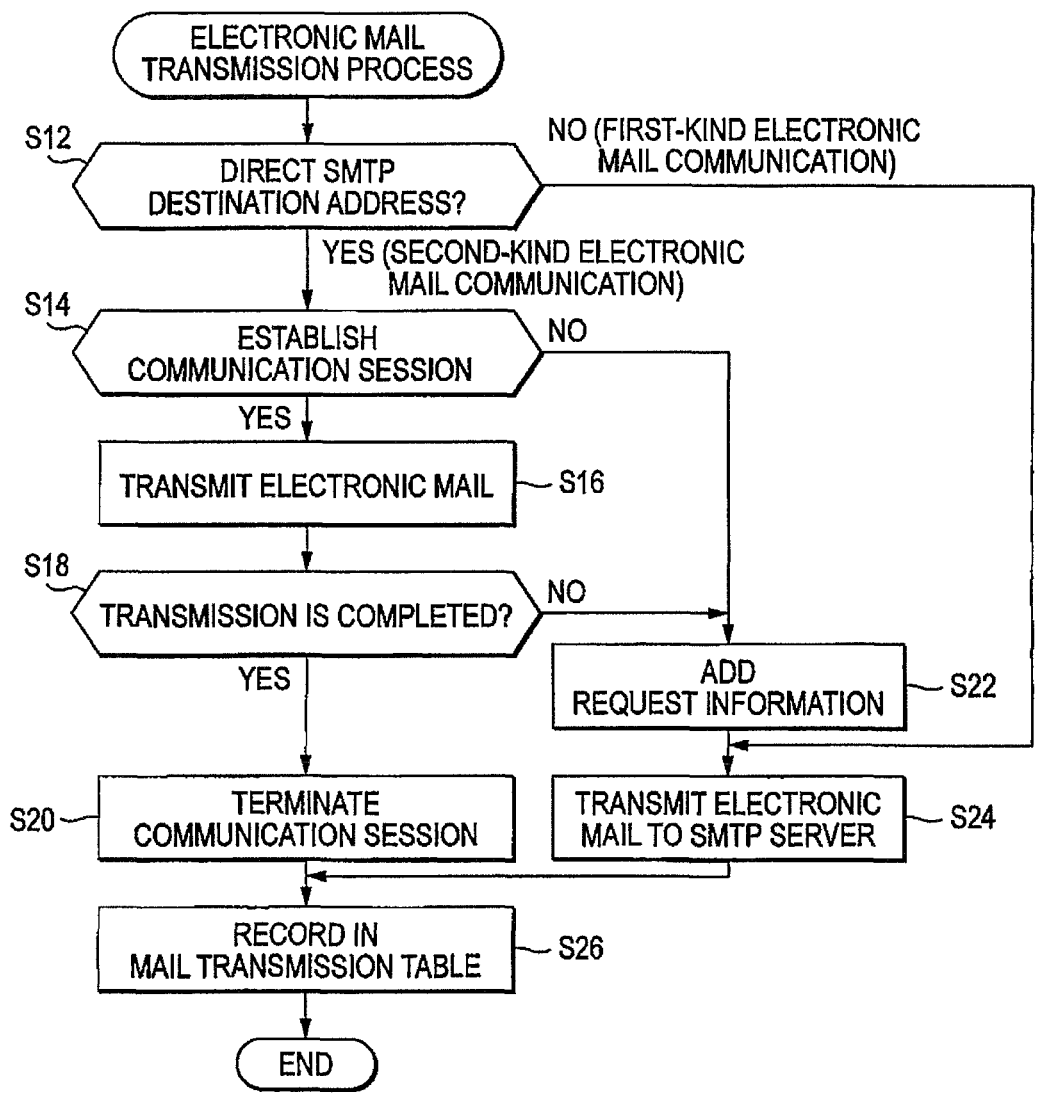
FIG. 2 is a flowchart of an electronic mail transmission process which is executed by a first multifunction machine.
Figure 3:
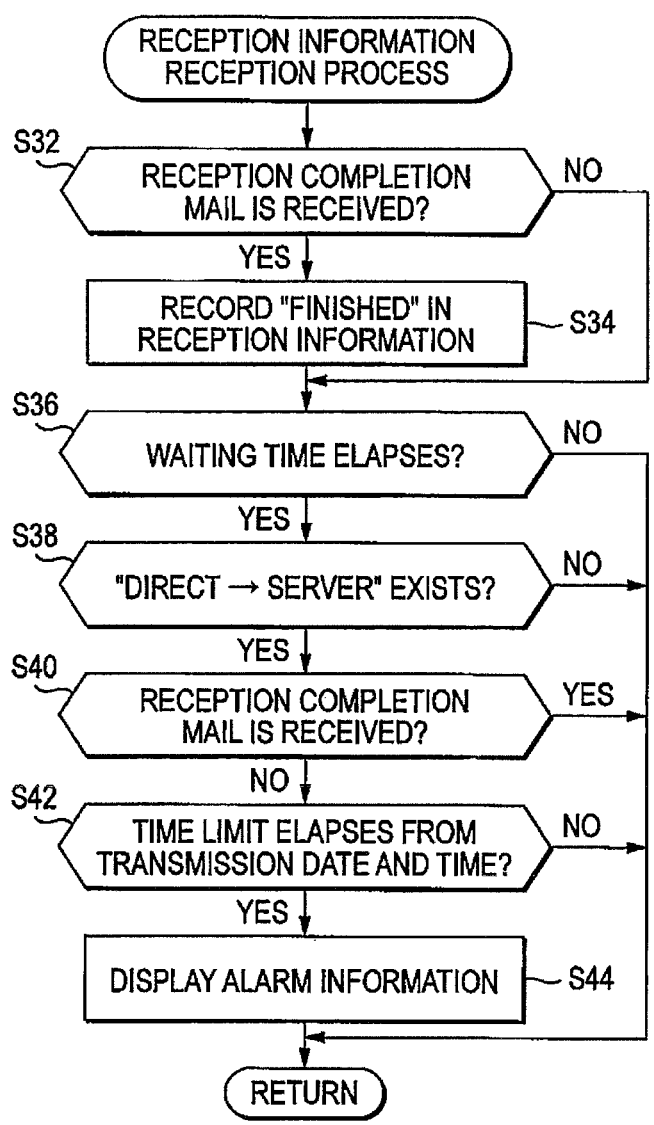
FIG. 3 is a flowchart of a reception completion mail reception process which is executed by the first multifunction machine.

In Case 2, in the case where an electronic mail cannot be transmitted by executing the second-kind electronic mail communication (NO in S14 of FIG. 2 or NO in S18), the first multifunction machine 10 executes the first-kind electronic mail communication in place of the second-kind electronic mail communication to transmit the electronic mail to the electronic mail server 100 (the SMTP server 104) (S24 of FIG. 2). In this case, the first multifunction machine 10 transmits a specific electronic mail containing the request information to the electronic mail server 100. The second multifunction machine 200 receives the specific electronic mail from the electronic mail server 100 (YES in S54 of FIG. 4). Before the electronic mail is output (displayed on the displaying portion 14 or printed by the print executing portion), the second multifunction machine 200 executes the second-kind electronic mail communication to transmit the reception completion mail to the first multifunction machine 10. According to the configuration, as compared to the configuration where, when the specific electronic mail is output in the second multifunction machine 200, the second multifunction machine 200 transmits a reception confirmation mail, the first multifunction machine 10 can early obtain reception information. In Case 2, moreover, the first multifunction machine 10 is not required to receive the reception completion mail from the POP server 102.

In Case 3, in a similar manner as in Case 2, the first multifunction machine 10 executes the first-kind electronic mail communication in place of the second-kind electronic mail communication to transmit the specific electronic mail to the electronic mail server 100 (the SMTP server 104) (S24 of FIG. 2). The second multifunction machine 200 receives the specific electronic mail from the electronic mail server 100 (YES in S54 of FIG. 4), and, in a similar manner as in Case 2, before the electronic mail is output, executes the second-kind electronic mail communication to try to transmit the reception completion mail to the first multifunction machine 10 (S60 of FIG. 4). If the reception completion mail cannot be transmitted by executing the second-kind electronic mail communication (NO in S62 of FIG. 4), the second multifunction machine 200 executes the first-kind electronic mail communication in place of the second-kind electronic mail communication before the electronic mail is output, thereby transmitting the reception completion mail to the electronic mail server 100 (the SMTP server 104) (S64 of FIG. 4). The first multifunction machine 10 obtains the reception completion mail from the electronic mail server 100 (the POP server 102). Also in Case 3, as compared to the configuration where, when the specific electronic mail is output in the second multifunction machine 200, the second multifunction machine 200 transmits a reception confirmation mail, the first multifunction machine 10 can early obtain reception information.

As seen from the above description, in any one of Cases 1 to 3, the first multifunction machine 10 can obtain reception information from the second multifunction machine 200. Namely, in any one of the first- and second-kind electronic mail communications, the first multifunction machine 10 can know that the second multifunction machine 200 of the transmission destination of an electronic mail receives the electronic mail.

The configuration where an electronic mail is transmitted to an external apparatus by executing the second-kind electronic mail communication (the direct SMTP) has an advantage that the external apparatus needs not be bothered to access the POP server 102 to receive the electronic mail, and hence the external apparatus can receive relatively early the electronic mail. The configuration has a further advantage that the external apparatus can transmit reception information by using a communication session which is established for performing communication of the electronic mail. As a result, the first multifunction machine 10 can early know that the external apparatus receives the electronic mail.

It is often that, in the case where an electronic mail is transmitted by executing the second-kind electronic mail communication, the user of the first multifunction machine 10 wishes that the electronic mail is received by the external apparatus as early as possible. In the embodiment, in the case where an electronic mail is transmitted by executing the first-kind electronic mail communication in place of the second-kind electronic mail communication, the first multifunction machine 10 adds request information to the electronic mail (S22 of FIG. 2). As a result, when receiving an electronic mail containing request information (YES in S54 and S56 of FIG. 4), the second multifunction machine 200 transmits the reception completion mail containing first reception information before the electronic mail is output. Therefore, the user of the first multifunction machine 10 can know relatively early that the second multifunction machine 200 receives the electronic mail.

The first and second multifunction machines 10, 200 are examples of "electric mail transmitting apparatus" and "electric mail receiving apparatus", respectively. The displaying portion 14 and the print executing portion are examples of "outputting unit". The address book 240 is an example of "feasibility information". Information recorded in the columns of the transmission date and time, transmission destination, and path which are contained in the mail transmission table 50 are examples of "first information". The information indicating "Finished" recorded in the reception information contained in the mail transmission table 50 is an example of "second information". The time limit is an example of "predetermined time period".

(Modifications)

(1) In the above-described embodiment, as a replay to an electronic mail containing request information (YES in S56 of FIG. 4) among electronic mails received from the POP server 102, the second multifunction machine 200 transmits the reception completion mail to the external apparatus which is the transmission source of the electronic mail. Alternatively, as replays to all electronic mails received from the POP server 102, the second multifunction machine 200 may transmit the reception completion mail to the external apparatuses which are the transmission sources of the electronic mails. In the case where the first multifunction machine 10 transmits an electronic mail to an external apparatus by executing the first-kind electronic mail communication, the first multifunction machine may transmit the electronic mail without adding request information to the electronic mail.

(2) In the above-described embodiment, by using the date and time information recorded in the column of the transmission date and time in the mail transmission table 50, the first multifunction machine 10 determines whether the predetermined time limit elapses or not (S42 of FIG. 3). Alternatively, the following configuration may be employed. In the case where combination information containing "Direct→Server" is recorded, the first multifunction machine 10 may record information indicative of the number by which the process of S42 of FIG. 3 is executed, into the combination information. In S42 of FIG. 3, in the case where the number recorded in the mail transmission table 50 is equal to or larger than a predetermined number (for example, five) and information indicating "Finished" is not recorded in the reception information, the first multifunction machine 10 may determine YES in S42 of FIG. 3. The case where the number recorded in the mail transmission table 50 is equal to or larger than the predetermined number (for example, five) and information indicating "Finished" is not recorded in the reception information is included in "case where the second information is not made correspondent with the first information even when a predetermined time period elapses after transmission of the first-kind electronic mail". In this case, the transmission date and time may not be recorded in the mail transmission table 50.

(3) In the mail transmission table 50, identification information for identifying a transmitted electronic mail (for example, the message ID of the electronic mail) may be recorded. In the modification, also the identification information is an example of "first information". In this case, the first multifunction machine 10 may transmit request information for requesting transmission of a reception completion mail containing identification information, to an external apparatus.

(4) In the above-described embodiment, in the case where the second multifunction machine 200 receives an electronic mail by executing the second-kind electronic mail communication (the direct SMTP), the second multifunction machine transmits the second reception information to the first multifunction machine 10 before the electronic mail is output. Alternatively, in the case where the second multifunction machine 200 receives an electronic mail by executing the second-kind electronic mail communication (the direct SMTP), the second multifunction machine transmits the second reception information to the first multifunction machine 10 after the electronic mail is output.

(5) The above-described technique of the embodiment may be applied not only to the multifunction machines 10, 200, but also to other communication apparatuses such as a PC, a printer, a scanner, and a facsimile apparatus.

(6) The first multifunction machine 10 may be able to add to an electronic mail, output confirmation request information for requesting the device of the transmission destination (for example, the second multifunction machine 200) of the electronic mail to transmit output confirmation information indicating that the electronic mail is output by the device of the transmission destination. The output confirmation information may be open acknowledge information indicating that, in the case where the electronic mail is opened (the electronic mail is output) by the device of the transmission destination of the electronic mail, for example, the electronic mail is opened. An electronic mail containing the open acknowledge information may be transmitted to the first multifunction machine 10. The first multifunction machine 10 may be able to add the output confirmation request information to at least one of first- and second-kind electronic mails. In the modification, the second multifunction machine 200 may be able to receive an electronic mail containing request information and output confirmation request information. In this case, the second multifunction machine 200 may transmit reception information to the first multifunction machine 10, subject to reception of the electronic mail. In other words, irrespective of whether the electronic mail is output by the outputting unit or not, the second multifunction machine 200 may transmit reception information to the first multifunction machine 10, subject to reception of the electronic mail. Alternatively, the second multifunction machine 200 may transmit output confirmation information to the first multifunction machine 10, subject to that the electronic mail is output (the electronic mail is opened). The second multifunction machine 200 may execute simultaneously in parallel the process of transmitting reception information, that of outputting an electronic mail, and that of transmitting output confirmation information. In this case, the timing when the second multifunction machine 200 transmits reception information may be earlier or later than that when output confirmation information is transmitted.

(7) In the above-described embodiment, when the CPU 22 executes processes in accordance with the mail communication program 34, the portions 60 to 68 are realized. Alternatively, at least one of the portions 60 to 68 may be realized by hardware such as a logic circuit. When the CPU 222 executes processes in accordance with the mail communication program 234, furthermore, the portions 260 to 268 are realized. Alternatively, at least one of the portions 260 to 268 may be realized by hardware such as a logic circuit.

Although the specific examples of the invention have been described in detail, these should be considered as mere exemplifications, and not limit the scope of the claims. The techniques described in the claims encompass various modifications and alterations of the above-illustrated specific examples. Moreover, the technical elements described in the specification or drawings exhibit technical utility either individually or in various combinations, and are not limited to combinations disclosed in the claims at the time of application. Furthermore, the technology illustrated in the specification or drawings simultaneously achieves a plurality of objects, and has technical utility by achieving one of these objects.

What is claimed is:

1. An electronic mail receiving apparatus that is to be used in a system including an electronic mail transmitting apparatus, the electronic mail receiving apparatus, and an electronic mail server which is configured separately from the electronic mail transmitting apparatus and the electronic mail receiving apparatus, the electronic mail receiving apparatus comprising:
a communicating unit configured to execute a first-kind electronic mail communication performed via the electronic mail server, and a second-kind electronic mail communication performed not via the electronic mail server, the second-kind electronic mail communication using a communication session established between the electronic mail transmitting apparatus and the electronic mail receiving apparatus; and
a mail output controller configured to control an outputting unit to output an electronic mail received from the electronic mail transmitting apparatus by the communicating unit;
wherein the communicating unit includes:
a first information transmitting portion configured to, in a first case where a first-kind electronic mail from the electronic mail transmitting apparatus is received by executing the first-kind electronic mail communication, transmit to the electronic mail transmitting apparatus, before the first-kind electronic mail is output by the outputting unit, first reception information indicating that the first-kind electronic mail is received; and
a second information transmitting portion configured to, in a second case where a second-kind electronic mail from the electronic mail transmitting apparatus is received by executing the second-kind electronic mail communication performed not via the electronic mail server by using the communication session established between the electronic mail transmitting apparatus and the electronic mail receiving apparatus, transmit, to the electronic mail transmitting apparatus, second reception information indicating that the second-kind electronic mail is received by using the communication session.

2. The electronic mail receiving apparatus according to claim 1, wherein:
if the electronic mail transmitting apparatus is able to execute the second-kind electronic mail communication, the first information transmitting portion transmits the first reception information to the electronic mail transmitting apparatus by executing the second-kind electronic mail communication; and
if the electronic mail transmitting apparatus is not able to execute the second-kind electronic mail communication, the first information transmitting portion transmits the first reception information to the electronic mail transmitting apparatus by executing the first-kind electronic mail communication.

3. The electronic mail receiving apparatus according to claim 2, further comprising a memory storing feasibility information indicating whether or not the electronic mail transmitting apparatus is able to execute the second-kind electronic mail communication;
wherein the first information transmitting portion determines whether or not the electronic mail transmitting apparatus is able to execute the second-kind electronic mail communication by using the feasibility information in the memory.

4. The electronic mail receiving apparatus according to claim 1, wherein in the first case:
if request information for requesting transmission of the first reception information is contained in the first-kind electronic mail, the first information transmitting portion transmits the first reception information to the electronic mail transmitting apparatus; and
if the request information is not contained in the first-kind electronic mail, the first information transmitting portion does not transmit the first reception information to the electronic mail transmitting apparatus.

5. The electronic mail receiving apparatus according to claim 1, wherein the outputting unit includes at least one of a displaying portion for displaying the electric mail and a print executing portion for printing the electric mail.

6. An electronic mail transmitting apparatus that is to be used in a system including the electronic mail transmitting apparatus, an electronic mail receiving apparatus and an electronic mail server which is configured separately from the electronic mail transmitting apparatus and the electronic mail receiving apparatus, the electronic mail transmitting apparatus comprising:
a communicating unit configured to execute a first-kind electronic mail communication performed via the electronic mail server, and a second-kind electronic mail communication performed not via the electronic mail server, the second-kind electronic mail communication using a communication session established between the electronic mail transmitting apparatus and the electronic mail receiving apparatus;
wherein the communicating unit includes:
a first information receiving portion configured to, in a first case where a first-kind electronic mail is transmitted to the electronic mail receiving apparatus by executing the first-kind electronic mail communication, receive from the electronic mail receiving apparatus first reception information indicating that a first-kind electronic mail is received; and
a second information receiving portion configured to, in a second case where a second-kind electronic mail is transmitted to the electronic mail receiving apparatus by executing the second-kind electronic mail communication performed not via the electronic mail server by using the communication session established between the electronic mail transmitting apparatus and the electronic mail receiving apparatus, receive from the electronic mail receiving apparatus by using the communication session second reception information indicating that the second-kind electronic mail is received;
wherein the first reception information is transmitted from the electronic mail receiving apparatus before the first-kind electronic mail is output by an outputting unit of the electronic mail receiving apparatus.

7. The electronic mail transmitting apparatus according to claim 6, wherein:
in a third case where the second-kind electronic mail containing data is not able to be transmitted to the electronic mail receiving apparatus by executing the second-kind electronic mail communication, the communicating unit transmits the first-kind electronic mail containing the data to the electronic mail receiving apparatus by executing the first-kind electronic mail communication.

8. The electronic mail transmitting apparatus according to claim 7, wherein:
in the third case the communicating unit transmits the first-kind electronic mail further containing request information for requesting transmission of the first reception information.

9. The electronic mail transmitting apparatus according to claim 7, further comprising:
a storage controller configured to store first information related to the first-kind electronic mail in a memory in the third case; and
if the first reception information is received from the electronic mail receiving apparatus in the third case, the storage controller stores, in the memory correspondingly with the first information, second information indicating that the first reception information is received.

10. The electronic mail transmitting apparatus according to claim 9, further comprising an alarm output controller configured to, if, in the third case, the second information is not made correspondent with the first information even when a predetermined time period elapses after transmission of the first-kind electronic mail, causes an outputting unit to output alarm information indicating that the first reception information is not received.

11. A network system, comprising:
an electronic mail transmitting apparatus;
an electronic mail receiving apparatus; and
an electronic mail server which is configured separately from the electronic mail transmitting apparatus and the electronic mail receiving apparatus;
wherein the electronic mail transmitting apparatus includes:
a first communicating unit configured to execute a first-kind electronic mail communication performed via the electronic mail server to transmit a first-kind electronic mail, and a second-kind electronic mail communication performed not via the electronic mail server to transmit a second-kind electronic mail, the second-kind electronic mail communication using a communication session established between the electronic mail transmitting apparatus and the electronic mail receiving apparatus;
wherein the electronic mail receiving apparatus includes:
a second communicating unit configured to execute a third-kind electronic mail communication to receive the first-kind electronic mail from the first communicating unit, and the second-kind electronic mail communication to receive the second-kind electronic mail; and
a mail output controller configured to control an outputting unit to output one of the first-kind and second-kind electronic mail received from the electronic mail transmitting apparatus by the second communicating unit;
wherein the second communicating unit includes:
a first information transmitting portion configured to, in a case where the second communicating unit receives the first-kind electronic mail from the first communicating unit, transmit to the electronic mail transmitting apparatus, before the first-kind electronic mail is output by the outputting unit, first reception information indicating that the first-kind electronic mail is received; and
a second information transmitting portion configured to, in a case where the second communicating unit receives the second-kind electronic mail from the first communicating unit not via the electronic mail server by using the communication session established between the electronic mail transmitting apparatus and the electronic mail receiving apparatus, transmit, to the electronic mail transmitting apparatus, second reception information indicating that the second-kind electronic mail is received by using the communication session; and
wherein the first communicating unit includes:
a first information receiving portion configured to receive the first reception information from the first information transmitting portion; and
a second information receiving portion configured to receive the second reception information from the second information transmitting portion by using the communication session.

* * * * *